United States Patent
Yamamoto

(10) Patent No.: US 9,007,605 B2
(45) Date of Patent: Apr. 14, 2015

(54) IMAGE FORMATION APPARATUS

(75) Inventor: Kazuya Yamamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 243 days.

(21) Appl. No.: 13/473,804

(22) Filed: May 17, 2012

(65) Prior Publication Data

US 2012/0300237 A1    Nov. 29, 2012

(30) Foreign Application Priority Data

May 24, 2011    (JP) .................................. 2011-116231

(51) Int. Cl.
- *G06F 3/12* (2006.01)
- *H04N 1/00* (2006.01)
- *G06F 15/00* (2006.01)

(52) U.S. Cl.
CPC ....... *H04N 1/00952* (2013.01); *H04N 1/00236* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0030969 A1* | 2/2004 | Kuramochi et al. | 714/712 |
| 2007/0146775 A1* | 6/2007 | Maeda | 358/1.15 |
| 2011/0058217 A1* | 3/2011 | Saito | 358/1.15 |
| 2011/0173473 A1* | 7/2011 | Cho | 713/323 |

FOREIGN PATENT DOCUMENTS

| | | | | |
|---|---|---|---|---|
| JP | 2000-242142 | * | 9/2000 | G03G 21/00 |
| JP | 2010-2500 A | | 1/2010 | |
| JP | 2011-034559 | * | 2/2011 | G06F 13/38 |

* cited by examiner

*Primary Examiner* — Marcus T Riley
*Assistant Examiner* — Pawandeep Dhingra
(74) *Attorney, Agent, or Firm* — Marvin A. Motsenbocker; Mots Law, PLLC

(57) ABSTRACT

An image formation apparatus includes an image reading control unit and a print control unit. The print control unit includes: a first communication control unit connected to the image reading control unit; and a power supply control unit configured to control power supply to the image reading control unit. The image reading control unit includes: a second communication control unit connected to the first communication control unit. When completing a process to transition to a power save mode in accordance with an instruction from the print control unit, the image reading control unit cuts off the communications through the second communication control unit. After sending the image reading control unit the instruction to transition to the power save mode, the print control unit detects the cutoff of the communications and then cuts off the power supply to the image reading control unit through the power supply control unit.

8 Claims, 15 Drawing Sheets

IMAGE FORMATION APPARATUS

CROSS REFERENCE TO RELATED APPLICATIONS

This application claims priority based on 35 USC 119 from prior Japanese Patent Application No. 2011-116231 filed on May 24, 2011, entitled "IMAGE FORMATION APPARATUS", the entire contents of which are incorporated herein by reference.

BACKGROUND OF THE INVENTION

1. Field of the Invention

The present disclosure relates to an image formation apparatus capable of reducing power consumption.

2. Description of Related Art

Some conventional image formation apparatuses transition to a power save mode for reducing power consumption when a predetermined condition for transition to the power save mode is satisfied. In this transition, such an image formation apparatus cuts off the power supply to a printer engine including an image fixation unit which consumes a particularly large amount of power among the constituent elements. Additionally, some recent image formation apparatuses (see Patent Document 1: Japanese Patent Application Publication No. 2010-002500 (Para. [0063] to [0067] and FIG. 3), for example) each achieve further reduction in power consumption by cutting off the power supply not only to the printer engine but also to a printer controller (print control unit) serving as a control unit and a scanner controller (image reading control unit).

Such an image formation apparatus transitions to a power save mode by having the printer controller and the scanner controller communicate with each other. Specifically, the printer controller instructs the scanner controller to transition to a power save mode, and thus the scanner controller transitions to the power save mode. Thereafter, the printer controller cuts off the power supply to the scanner controller.

SUMMARY OF THE INVENTION

In the above conventional technique, however, the printer controller and the scanner controller are connected to each other through a communication line such as a universal serial bus (USB). After the printer controller instructs the scanner controller to transition to the power save mode through the communication line, the scanner controller notifies the printer controller whether or not transition to the power save mode is completed. This notification requires the provision of a signal line different from the communication line, and therefore is problematic.

The invention has been made to solve the above problem, and aims to enable a notification that transition to a power save mode is completed to be made through a communication line.

An aspect of the invention is an image formation apparatus including: an image reading control unit configured to control a scanner that reads an image of an original; and a print control unit configured to control a print engine that prints an image on a sheet. The print control unit includes: a first communication control unit connected to the image reading control unit through a communication line, and configured to communicate with the image reading control unit and to monitor the state of the communications; and a power supply control unit configured to control the power supply to the image reading control unit. The image reading control unit includes: a second communication control unit connected to the first communication control unit through the communication line, and configured to communicate with the print control unit as well as to cut off the communications. When completing processing to transition to a power save mode in accordance with an instruction from the print control unit, the image reading control unit cuts off the communications through the second communication control unit. After sending the image reading control unit the instruction to transition to the power save mode through the first communication control unit, the print control unit detects the cutoff of the communications and then cuts off the power supply to the image reading control unit through the power supply control unit.

According to this aspect, it is possible to notify through a communication line that transition to a power save mode is completed.

DETAILED DESCRIPTION OF EMBODIMENTS

Figure 1:
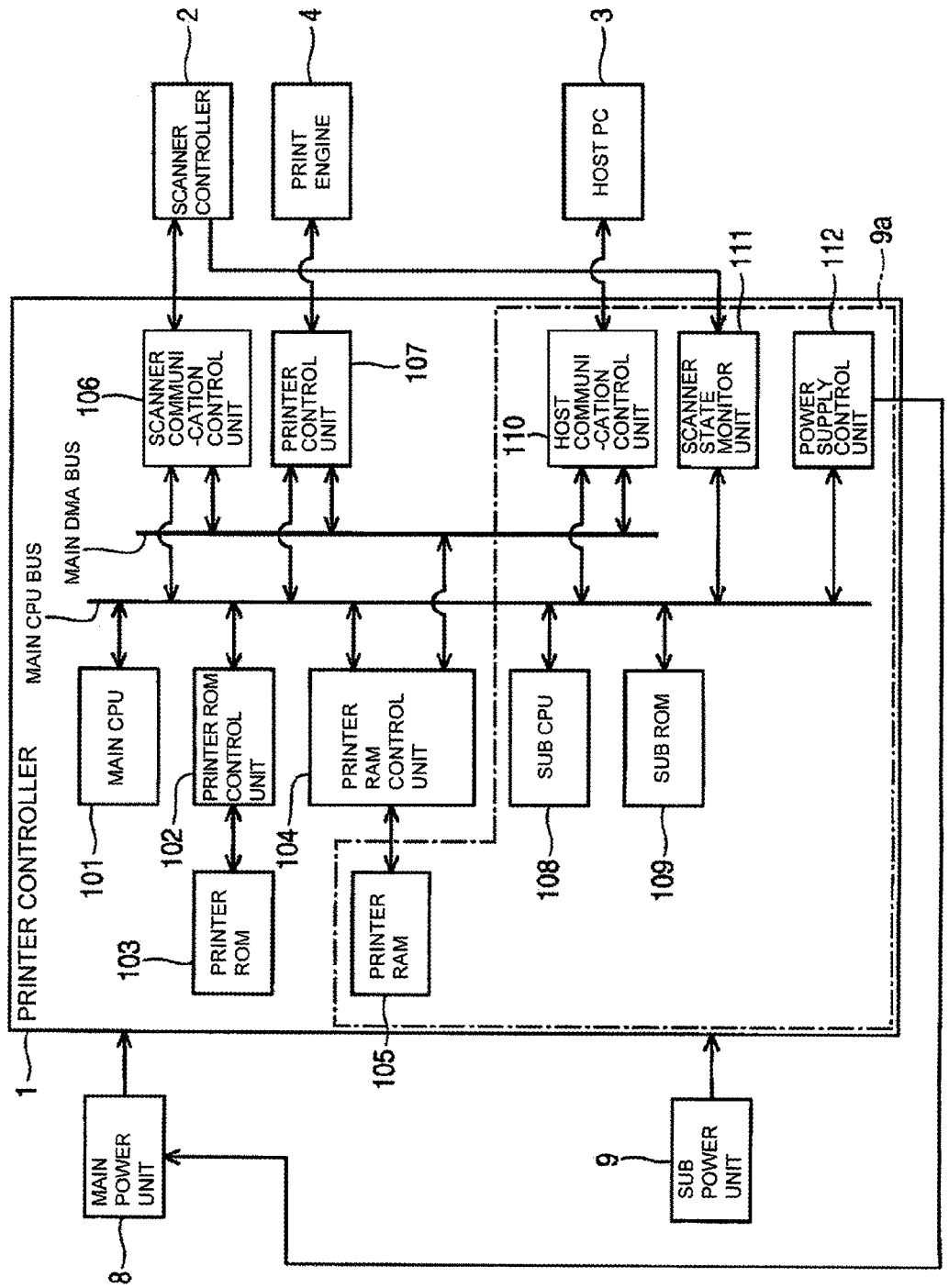
FIG. 1 is a block diagram illustrating a configuration of a printer controller according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiments of an image formation apparatus according to the invention are described below by referring to the drawings.

First Embodiment

Figure 2:
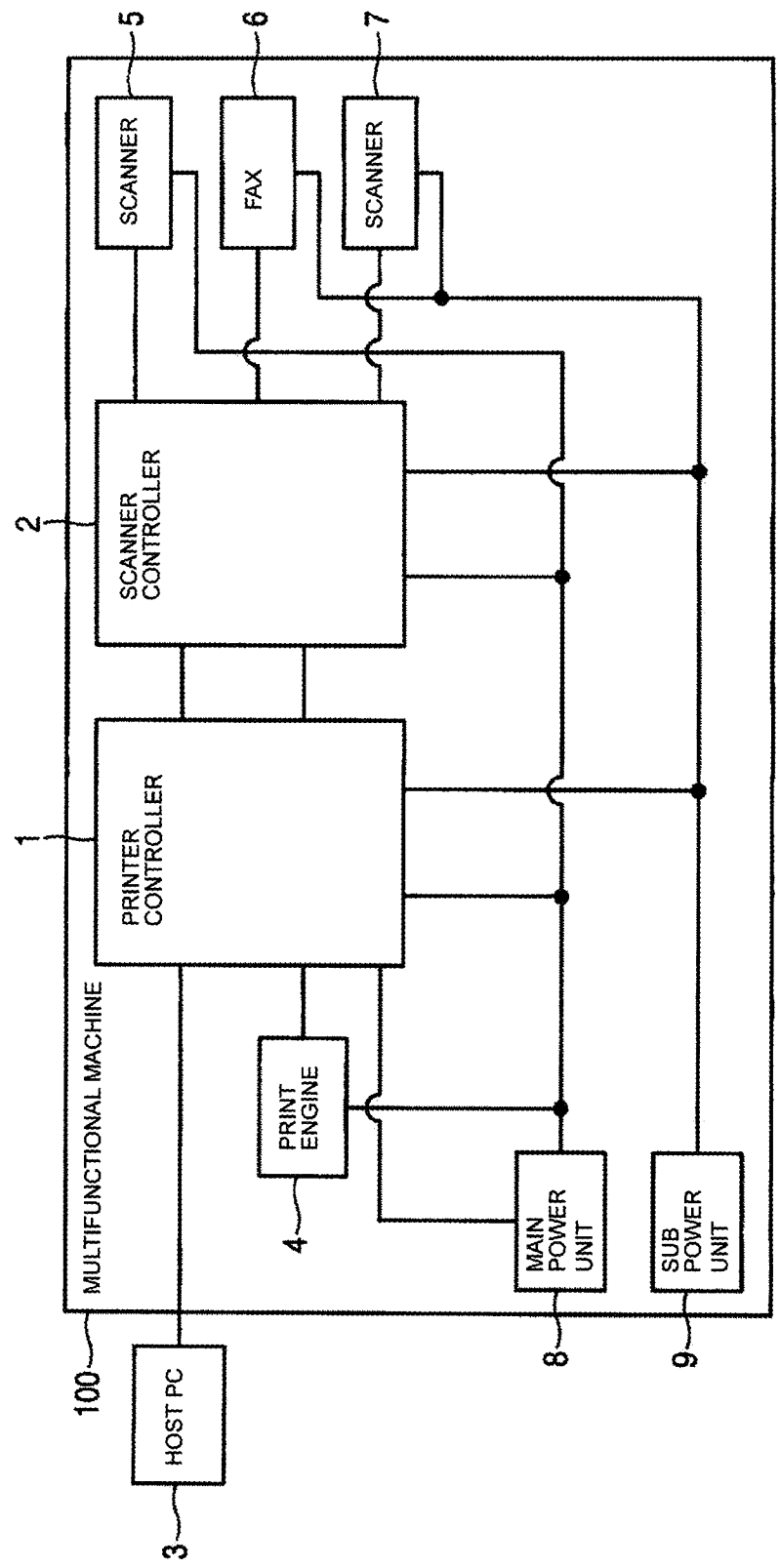
FIG. 2 is a block diagram illustrating a configuration of an image formation apparatus according to the first embodiment.

FIG. 2 is a block diagram illustrating a configuration of an image formation apparatus according to the first embodiment. In FIG. 2, multifunctional machine 100 serving as an image formation apparatus is used as a printer, a photocopier, a document scanner, and a fax machine.

Multifunctional machine 100 includes printer controller 1, scanner controller 2, print engine 4, scanner 5, FAX 6, operation unit 7, main power unit 8, and sub power unit 9. Printer controller 1 serves as a print control unit configured to control print engine 4 for printing images on paper sheets. Scanner controller 2 serves as an image reading control unit configured to control scanner 5 for reading images of the originals. FAX 6 serves as a fax machine. Printer controller 1 is connected through a communication line to host personal computer (host PC) 3 serving as an external apparatus. In addition, printer controller 1 is also connected to scanner controller 2 through a communication line such as a universal serial bus (USB).

Printer controller 1 includes a computing unit and a control unit such as a central processing unit (CPU), and a storage unit such as a memory. Print controller 1 is configured to control the operations of print engine 4, the reception of data from scanner controller 2, the communications with host PC 3, and the power supply to multifunctional machine 100.

Scanner controller 2 includes a computing unit and a control unit such as a CPU, and a storage unit such as a memory. Scanner controller 2 is configured to control the system of scanner 5, the image reading of originals by scanner 5, the data transmission and reception by FAX 6, the display by a display unit in operation unit 7, and the input through an input unit in operation unit 7. Scanner controller 2 is also configured to control the transmission, to printer controller 1, of image data of originals read by scanner 5 and image data received by FAX 6.

Host PC 3 is a computer that creates data to be printed by multifunctional machine 100, transmits the created data to multifunctional machine 100 through a communication line, such as a USB and a local area network (LAN), and receives status information (hereinafter, referred to as the "status"), which represents the state of the apparatus, from multifunctional machine 100 through the communication line.

In response to an instruction from printer controller 1, print engine 4 prints an image on a paper medium on the basis of image formation data, which is generated from either the data sent from host PC 3 and received by printer controller 1 or image data of the original sent from scanner controller 2 and received by printer controller 1. In response to an instruction from operation unit 7 or host PC 3, scanner 5 reads images of originals and thereby allows multifunctional machine 100 to function as a photocopier or a scanner. FAX 6 is a fax machine, and is configured to exchange image data and the like through a telephone line.

Operation unit 7 includes: a display unit such as a liquid crystal display; and an input unit such as switches and buttons. Operation unit 7 receives operations by a user making various settings for multifunctional machine 100 and giving various instructions, such as an instruction to start a copy or scan operation and an instruction to return from the power save mode. Main power unit 8 is a power supply for the principal portions of multifunctional machine 100. Main power unit 8 is connected to an external power supply (e.g., an AC power supply), and is supplied with power by the external power supply. Sub power unit 9 supplies power to portions in multifunctional machine 100 that work even in the power save mode. Sub power unit 9 may be connected to the external power supply (e.g., the AC power supply), and supplied with power by the external power supply. Alternatively, sub power unit 9 may include either a primary or secondary battery.

When multifunctional machine 100 satisfies a predetermined condition in the ordinary mode with power supplied from both main power unit 8 and sub power unit 9, multifunctional machine 100 cuts off the power supply from main power unit 8, and transitions to the power save mode where multifunctional machine 100 works solely with power supply from sub power unit 9. Here, the predetermined condition is, for example, that multifunctional machine 100 stays in the standby state continuously for a predetermined period.

FIG. 1 is a block diagram illustrating a configuration of a printer controller according to the first embodiment. Printer controller 1 shown in FIG. 1 includes main CPU 101, printer ROM control unit 102, printer ROM 103, printer RAM control unit 104, printer RAM 105, scanner communication control unit 106, printer control unit 107, sub CPU 108, sub ROM 109, host communication control unit 110, scanner state monitor unit 111, and power supply control unit 112. These units in printer controller 1 are connected to one another through a main CPU bus and a main DMA (direct memory access) bus.

Main CPU bus is an internal bus connecting those units accessible from main CPU 101 and sub CPU 108. Main DMA bus connects printer RAM control unit 104 and units that directly transmit and receive data to and from printer RAM 105, such as scanner communication control unit 106, printer control unit 107, and host communication control unit 110.

Main CPU 101 is a central processing unit configured to control the overall operations of printer controller 1, and operates by fetching programs (software) from printer ROM 103 or printer RAM 105. Printer ROM control unit 102 is configured to control the access by main CPU 101 to printer ROM 103. Printer ROM control unit 102 converts the interface of the main CPU bus to the interface of printer ROM 103.

Printer ROM 103 is a non-volatile memory (for example, a NOR-type flash ROM and a NAND-type flash ROM) and stores programs for operating main CPU 101. Printer RAM control unit 104 controls the access by main CPU 101 to printer RAM 105 through main CPU bus, and the access by scanner communication control unit 106, printer control unit 107, and host communication control unit 110 to printer RAM 105 through main DMA bus. Printer RAM control unit 104 converts the interface of main CPU bus and the interface of the main DMA bus to the interface of the printer RAM 105.

Printer RAM 105 is a volatile, fast access memory (for example, a volatile memory device with a self-refresh mode, such as a DDR SDRAM, a DDR2 SDRAM, and a DDR3 SDRAM). Printer RAM 105 stores programs for operating main CPU 101, image data read from originals and received from scanner controller 2, and print data received from host PC 3. Note that the term "self refresh" refers to a function of a memory device to perform a refresh operation by itself, and to keep the memory contents without any control from the outside of the memory device.

Figure 3:
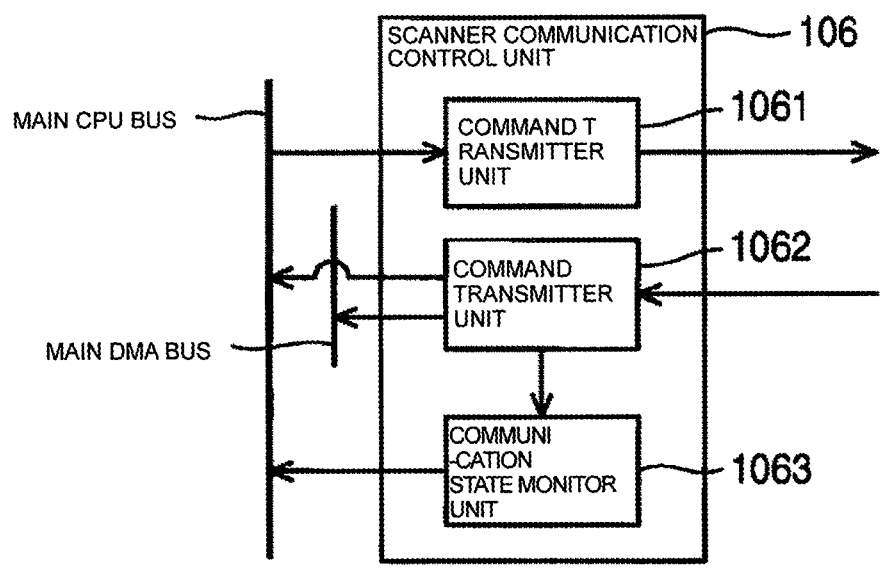
FIG. 3 is a block diagram illustrating a configuration of a scanner communication control unit according to the first embodiment.

Scanner communication control unit 106 as a first communication control unit is configured to control the communications with scanner controller 2, and includes command transmitter unit 1061, status receiver unit 1062, and communication state monitor unit 1063, as shown in FIG. 3. Command transmitter unit 1061 shown in FIG. 3 is configured to send various commands to scanner controller 2, such as a command to transition to the power save mode, a command to check whether or not there is image data read from an original, and a command to check the state of scanner controller 2.

Status receiver unit 1062 is configured to receive responses that scanner controller 2 sends in response to the commands sent by command transmitter unit 1061, and receive image data read by scanner 5 from scanner controller 2. Communication state monitor unit 1063 is configured to monitor whether or not a response to a command sent by command transmitter unit 1061 is received from the scanner controller. Communication state monitor unit 1063 detects the cutting off of the communications with scanner controller 2 when no response to the command sent to scanner controller 2 is received.

Scanner communication control unit 106 serves as a master station in the communication control. Scanner communication control unit 106 starts communications with scanner controller 2 (slave station) by making command transmitter unit 1061 send a command, and completes the communications when status receiver unit 1062 receives a status responding to the sent command. Scanner communication control unit 106 configured as above communicates with scanner controller 2 connected thereto through a communication line such as a USB, and also monitors the state of the communications with scanner controller 2.

Printer control unit 107 shown in FIG. 1 is configured to perform an image processing on the read image data or the print data stored in printer RAM 105. Printer control unit 107 is also configured to send print engine 4 the data after the image processing. Sub CPU 108 is a central processing unit configured to operate by fetching the programs (software) from sub ROM 109, and control the communications with host PC 3 and the power supply to multifunctional machine 100.

Sub ROM 109 is a non-volatile memory (for example, a NOR-type flash ROM and a NAND-type flash ROM), and stores programs for operating sub CPU 108. Host communication control unit 110 is configured to control communications with host PC 3. Host communication control unit 110 is also configured to receive print data sent by host PC 3, and to send the status of multifunction printer 100 to host PC 3.

Scanner state monitor unit 111 is configured to monitor, through a signal line, whether or not there is a request made by scanner controller 2 for starting the power supply. Power supply control unit 112 is configured to control the power supply from main power unit 8. When multifunctional machine 100 is in the ordinary mode, power supply control unit 112 cuts off the power supply from main power unit 8 under the control of main CPU 101 in accordance with the state of communication state monitor unit 1063 of control unit 106 shown in FIG. 3. When multifunctional machine 100 is in the power save mode, power supply control unit 112 starts the power supply from main power unit 8 under the control of sub CPU 108 in accordance with the state of scanner state monitor unit 111.

Note that in FIG. 1, the area enclosed by dashed-dotted line 9a is an area supplied with power by sub power unit 9. The power supply thereto is not cut off even when multifunctional machine 100 is in the power save mode. In contrast, the power supply to the outside of the area enclosed by dashed-dotted line 9a is cut off when multifunctional machine 100 is in the power save mode. In addition, as is described later, power supply control unit 112 is capable of controlling the power supply to scanner controller 2.

Figure 4:
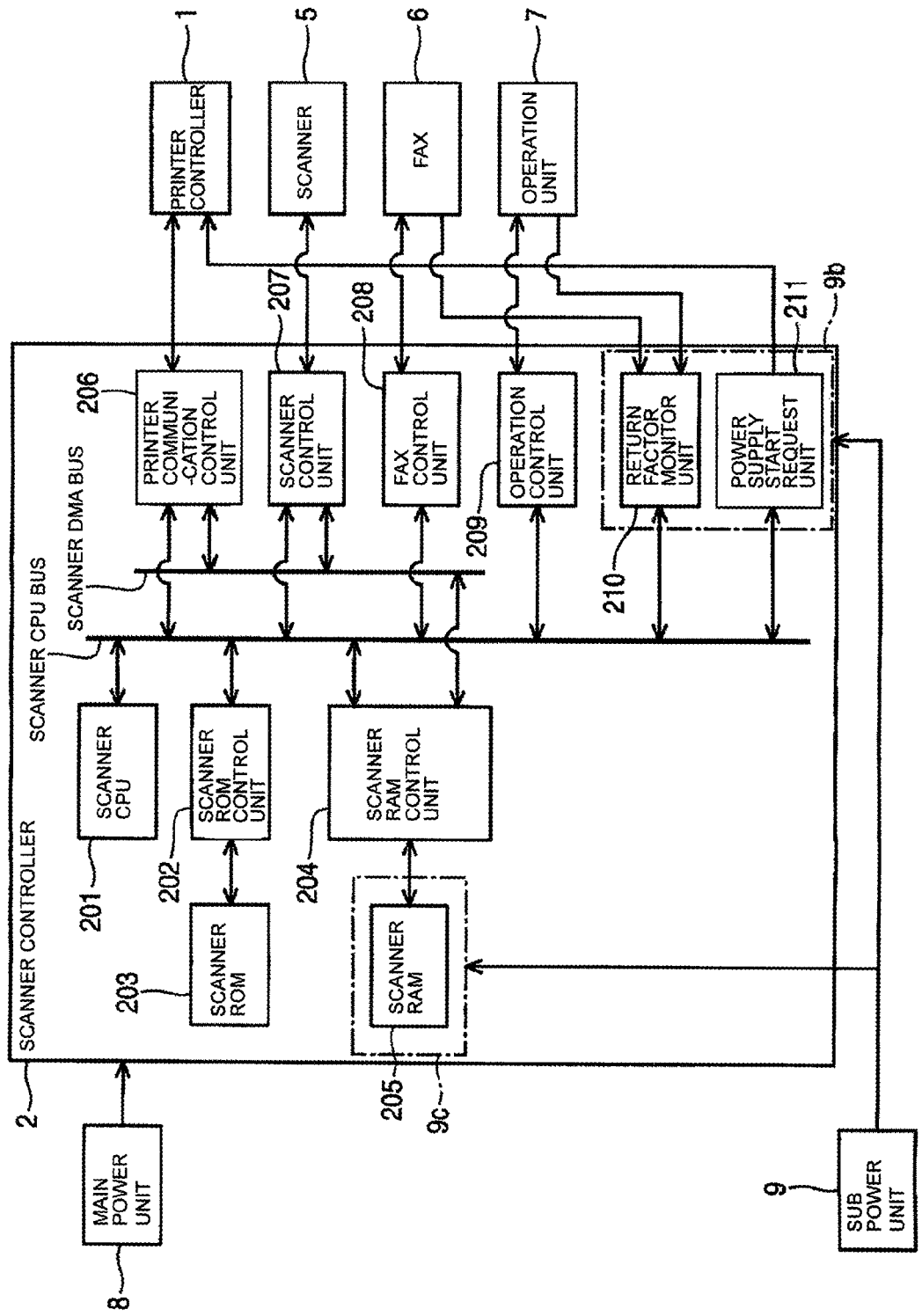
FIG. 4 is a block diagram illustrating a configuration of a scanner controller according to the first embodiment.

FIG. 4 is a block diagram illustrating a configuration of a scanner controller according to the first embodiment. Scanner controller 2 shown in FIG. 4 includes scanner CPU 201, scanner ROM control unit 202, scanner ROM 203, scanner RAM control unit 204, scanner RAM 205, printer communication control unit 206, scanner control unit 207, FAX control unit 208, operation control unit 209, return factor monitor unit 210, and power supply start request unit 211. These units are connected to one another through a scanner CPU bus and a scanner DMA bus.

Scanner CPU bus is an internal bus connecting those units accessible from scanner CPU 201. In addition, scanner DMA bus connects scanner RAM control unit 204 and units that directly transmit and receive data to and from scanner RAM 205, such as printer communication control unit 206 and scanner control unit 207. Scanner CPU 201 is a central processing unit configured to control the overall operations of scanner controller 2, and operates by fetching the programs (software) fetched from scanner ROM 203 or scanner RAM 205.

Scanner ROM control unit 202 is configured to control the access by scanner CPU 201 to scanner ROM 203, and convert the interface of the scanner CPU bus to the interface of the scanner ROM 203. Scanner ROM 203 is a non-volatile memory (for example, a NOR-type flash ROM and a NAND-type flash ROM), and stores programs for operating scanner CPU 201.

Scanner RAM control unit 204 is configured to control the access by scanner CPU 201 to scanner RAM 205 through the scanner CPU bus, and the access by printer communication control unit 206 and scanner control unit 207 to scanner RAM 205 through the scanner DMA bus. Scanner RAM control unit 204 converts the interface of the scanner CPU bus or the interface of the scanner DMA bus to the interface of the scanner RAM 205.

Scanner RAM 205 serving as a storage unit is a volatile, fast access memory (for example, a volatile memory device with a self-refresh mode, such as a DDR SDRAM, a DDR2 SDRAM, or a DDR3 SDRAM. Scanner RAM 205 stores programs for operating scanner CPU 201, image data read from originals by the scanner control unit 207, and image data received by FAX control unit 208, for example.

Figure 5:
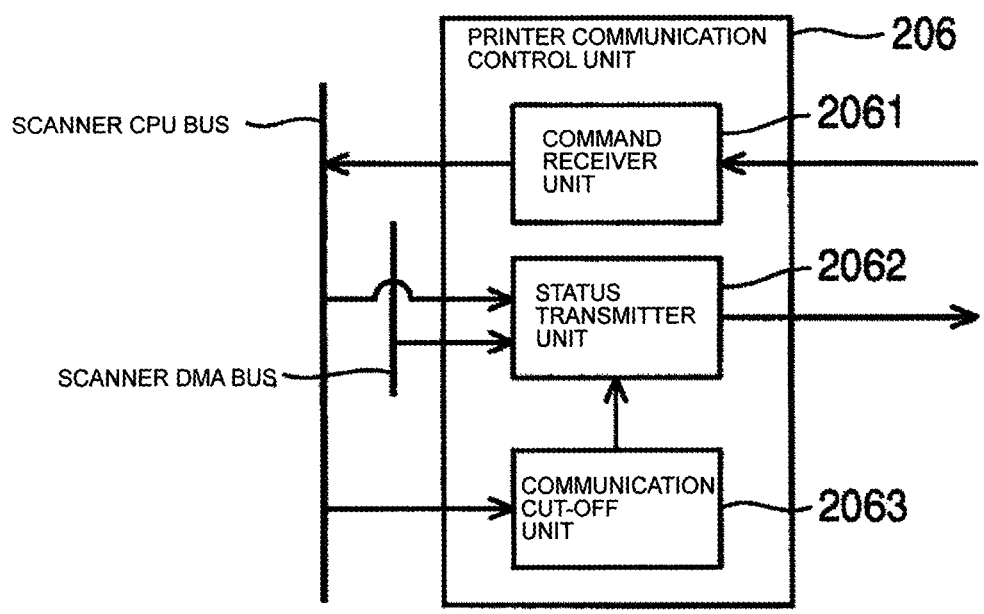
FIG. 5 is a block diagram illustrating a configuration of a printer communication control unit according to the first embodiment.

Printer communication control unit 206 serving as a second communication control unit is configured to control the communications with printer controller 1, and includes a command receiver unit 2061, status transmitter unit 2062, and communication cut-off unit 2063, as shown in FIG. 5.

Command receiver unit 2061 shown in FIG. 5 is configured to receive various commands sent by printer controller 1, such as a command to transition to the power save mode, a command to check whether or not there is image data read from an original, and a command to check the state of scanner controller 2. Status transmitter unit 2062 is configured to send printer controller 1 a response to the command received by command receiver unit 2061. Besides the responses to the commands, status transmitter unit 2062 also sends image data read by scanner 5.

After a command to transition to the power save mode sent by printer controller 1 is received by command receiver unit 2061 and scanner controller 2 completes the power save mode transition processing, communication cut-off unit 2063 stops status transmitter unit 2062 from performing the transmission processing. When stopped from performing the transmission processing, status transmitter unit 2062 can be made to withhold the transmission of a response to a command from printer controller 1.

Printer communication control unit 206 serves as a slave station in the communication control. Printer communication control unit 206 starts communications with printer controller 1 (master station) when command receiver unit 2061 receives a command, and completes the communications when status transmitter unit 2062 completes the sending of a status in response to the command received by command receiver unit 2061. Printer communication control unit 206 configured as above communicates with scanner communication control unit 106 (see FIG. 1) of printer controller 1 connected thereto through a communication line such as a USB. In addition, printer communication control unit 206 is capable of cutting off the communications with scanner communication control unit 106.

Scanner control unit 207 shown in FIG. 4 is configured to control image sensors, motors, and clutches in scanner 5, thereby making scanner 5 read image data of an original. Scanner control unit 207 sends the read image data to scanner RAM 205. FAX control unit 208 is configured to control the modem of FAX 6, thereby making FAX 6 transmit and receive data such as image data through a telephone line. FAX control unit 208 sends scanner RAM 205 data received through the telephone line and receives from scanner RAM 205 data to be transmitted through the telephone line.

Operation control unit 209 is configured to control the display change of the display unit in operation unit 7, for example. In addition, operation control unit 209 is configured to detect the pressed-down state of each of the switches and buttons of operation unit 7, including a power save mode cancel button, and to perform appropriate control in accordance with the detection. Return factor monitor unit 210 is configured to monitor, as various factors which trigger the returning from the power save mode to the ordinary mode, whether or not an interrupt signal comes from the modem of FAX 6, and whether or not the power save mode cancel button of operation unit 7 is pressed down. Return factor monitor unit 210 notifies power supply start request unit 211 of the information obtained by the monitoring.

Power supply start request unit 211 is configured to request printer controller 1 to start the power supply. Power supply start request unit 211 requests printer controller 1 to start the power supply when multifunctional machine 100 is in the power save mode and return factor monitor unit 210 detects the occurrence of one of the factors which trigger the returning from the power save mode to the ordinary mode.

Note that in FIG. 4, the areas enclosed by dashed-dotted lines 9b and 9c are areas supplied with power by sub power unit 9. More specifically, the power supply to the areas enclosed by dashed-dotted lines 9b and 9c is not cut off even when multifunctional machine 100 is in the power save mode. In contrast, the power supply to the outside of the areas enclosed by dashed-dotted lines 9b and 9c is cut off when multifunctional machine 100 is in the power save mode.

Figure 6:
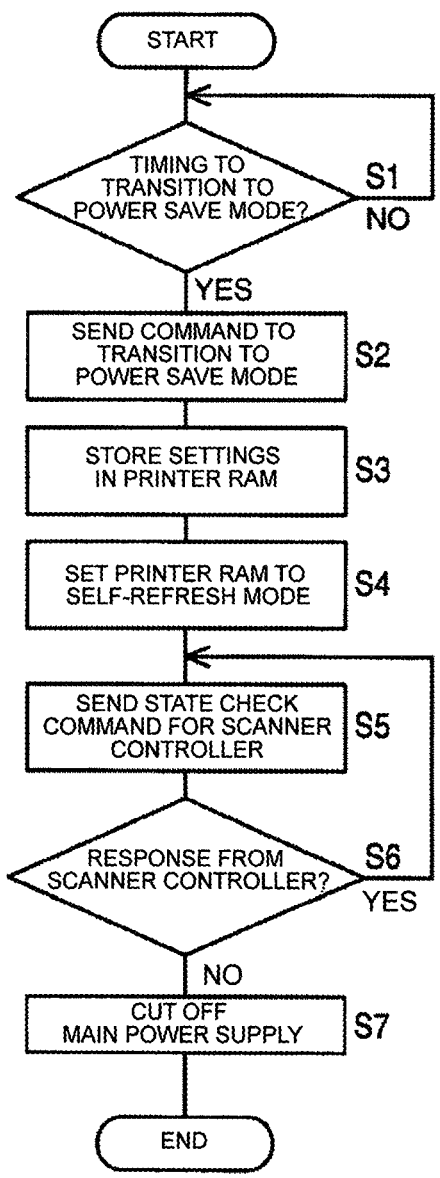
FIG. 6 is a flowchart illustrating a power save mode transition processing performed by the printer controller according to the first embodiment.

Description is given of the operations of the above configurations. First of all, power save mode transition processing performed by the printer controller of the multifunctional machine are described by referring to FIGS. 1 and 2 and following the steps denoted by S in the flowchart shown in FIG. 6 illustrating the power save mode transition processing performed by the printer controller according to the first embodiment.

S1: Main CPU 101 of printer controller 1 judges whether or not the timing is to transition to the power save mode. When main CPU 101 judges that the timing is to transition to the power save mode, the processing proceeds to S2. When main CPU 101 judges that the timing is not to transition to the power save mode, main CPU 101 waits for the timing to transition to the power save mode. Here, the timing to transition to the power save mode refers to a case where multifunctional machine 100 has been in a standby state for a certain length of time, for example, a case where no data have been received from host PC 3 for a certain length of time, or a case where no images of originals have been read by scanner 5 for a certain length of time.

S2: Main CPU 101 sends scanner controller 2 a command to transition to the power save mode, through command transmitter unit 1061 shown in FIG. 3.

S3: After sending scanner controller 2 a command to transition to the power save mode, main CPU 101 stores in printer RAM 105 various pieces of information required for printer controller 1.

Here, various pieces of information required for printer controller 1 refers to operation setting information needed for operations of main CPU 101, and various kinds of parameters needed in the print control. While main CPU 101 stores in printer RAM 105 the pieces of information required for printer controller 1, main CPU 101 stores in an unillustrated register apiece of information representing the transition to the power save mode. The register exists in an area supplied with power by sub power unit 9. Accordingly, the content stored in the register is not erased even in the power save mode.

S4: Printer RAM 105 storing the pieces of information is set to the self-refresh mode by main CPU 101 through printer RAM control unit 104.

S5: After setting printer RAM 105 to the self-refresh mode, main CPU 101 sends scanner controller 2a command to check whether or not scanner controller 2 has transitioned to the power save mode, through command transmitter unit 1061 shown in FIG. 3.

S6: After main CPU 101 sends the command to check whether or not scanner controller 2 has transitioned to the power save mode, communication state monitor unit 1063 shown in FIG. 3 monitors whether or not there is a response to the command. When there is a response, the processing proceeds to S5 and main CPU 101 sends another command to check whether or not scanner controller 2 has transitioned to the power save mode. In contrast, when there is no response to the command, the processing proceeds to S7.

S7: When there is no response to the command, communication state monitor unit 1063 judges that the communications with scanner controller 2 are cut off. Then, communication state monitor unit 1063 notifies main CPU 101 of the cutoff of the communications. Upon receiving the notification, main CPU 101 cuts off the power supply from main power unit 8, through power supply control unit 112. In this way, printer controller 1 transitions to the power save mode.

Figure 7:
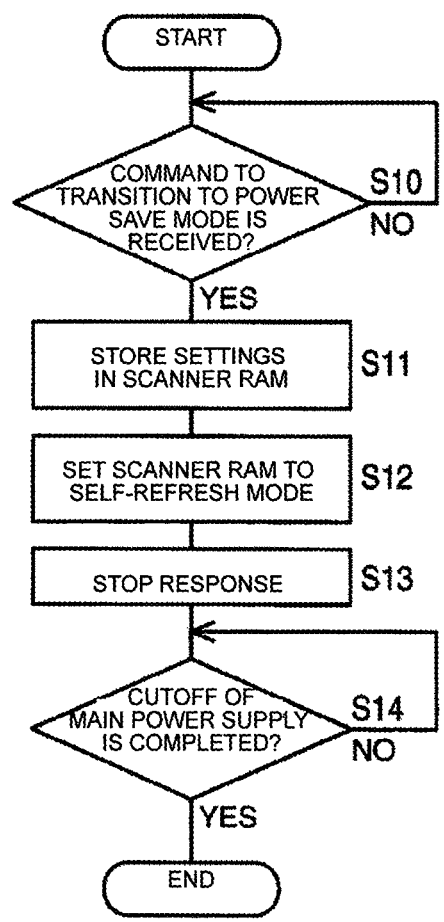
FIG. 7 is a flowchart illustrating a power save mode transition processing performed by the scanner controller according to the first embodiment.

Next, a description is given of the power save mode transition processing performed by the scanner controller of the multifunctional machine, by referring to FIGS. 2 and 4. The description is given following the steps denoted by S in the flowchart shown in FIG. 7 illustrating the power save mode transition processing performed by the scanner controller according to the first embodiment.

S10: Scanner CPU 201 of scanner controller 2 judges whether or not the command to transition to the power save mode sent from printer controller 1 has already been received through printer communication control unit 206. When scanner CPU 201 judges that the command to transition to the power save mode has been received, the processing proceeds to S11. When scanner CPU 201 judges that no command to transition to the power save mode has been received yet, scanner CPU 201 waits for the reception of the command to transition to the power save mode.

S11: After judging that the command to transition to the power save mode has already been received, scanner CPU 201 stores in scanner RAM 205 various pieces of information required for scanner controller 2. Here, the various pieces of information required for scanner controller 2 refer to operation setting information needed for operations of scanner CPU 201, and various kinds of parameters needed in the control for image reading of an original and the FAX control.

While scanner CPU 201 stores in scanner RAM 205 the pieces of information required for scanner controller 2, scanner CPU 201 stores in an unillustrated register a piece of information representing the transition to the power save mode. The register exists in an area to which power is supplied by sub power unit 9. Accordingly, the content stored in the register is not erased even in the power save mode. In short, the register is a non-volatile power-save-mode transition information storage unit.

S12: Scanner RAM 205 storing the pieces of information is set to the self-refresh mode by scanner CPU 201 through scanner RAM control unit 204.

S13: After setting scanner RAM 205 to the self-refresh mode, scanner CPU 201 stops the operations of status transmitter unit 2062 through command cut-off unit 2063 shown in FIG. 5, thereby stopping sending to printer controller 1 the response of the status.

When scanner controller 2 receives a command from printer controller 1 even during the power save mode transition processing, scanner controller 2 responds to the command. Here, scanner controller 2 cuts off the communications with printer controller 1 by stopping sending to printer controller 1 the response of the status.

S14: After stopping sending to printer controller 1 the response of the status, scanner CPU 201 waits for printer controller 1 to cut off the power supply from main power unit 8. When the power supply from main power unit 8 is cut off, scanner controller 2 transitions to the power save mode.

As described above, once scanner controller 2, instructed by printer controller 1 to transition to the power save mode, completes the power save mode transition processing, scanner controller 2 cuts off the communications with printer controller 1. Hence, although no special signal line is provided for signals indicating the completion of the transition to the power save mode between printer controller 1 and scanner controller 2, printer controller 1 detects the cutoff of the communications with scanner controller 2 and can judge that scanner controller 2 has completed the power save mode transition processing. Consequently, printer controller 1 can cut off the power supply to scanner controller 2.

Figure 8:
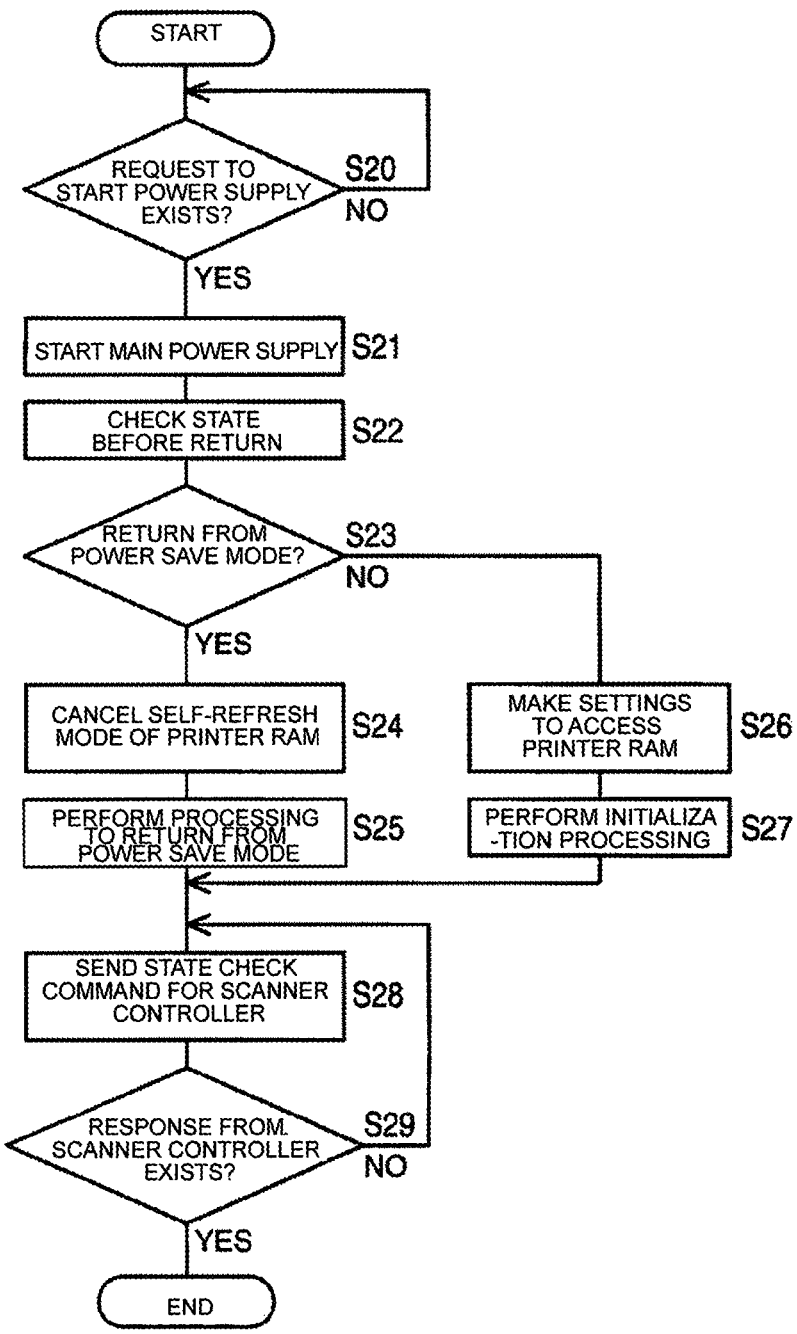
FIG. 8 is a flowchart illustrating a return-from-power save mode processing performed by the printer controller according to the first embodiment.

Next, description is given of return-from-power save mode processing performed by the printer controller of the multifunctional machine by referring to FIGS. 1 and 2 and following the steps denoted by S in the flowchart shown in FIG. 8 illustrating the return-from-power save mode processing performed by the printer controller according to the first embodiment.

S20: Sub CPU 108 of printer controller 1 judges whether or not there is a request for the start of the power supply. When sub CPU 108 judges that there is a request for the start of the power supply, the processing proceeds to S21. When sub CPU 108 judges that there is no request for the start of the power supply, sub CPU 108 waits for a request for the start of the power supply. Here, request for the start of the power supply refers to a reception, by host communication control unit 110, of data sent from host PC 3 or a reception, by scanner state monitor unit 111, of a power supply request signal from scanner controller 2.

S21: After judging that there is a request for the start of the power supply, sub CPU 108 starts the power supply from main power unit 8, through power supply control unit 112.

S22: Once the power supply from main power unit 8 is started, main CPU 101 fetches a program from printer ROM 103 and checks the state before the power supply (before the return).

Here, checking of the state before the power supply refers to the checking of whether the power supply from main power unit 8 and sub power unit 9 has been cut off, i.e. the power supply to entire multifunctional machine 100 has been cut off or multifunctional machine 100 has been in the power save mode. By referring to the content stored in the unillustrated register, it is possible to check which of the above-mentioned two states multifunctional machine 100 has been in. When the state before the power supply is the power save mode, the register has information indicating the transition to the power save mode. In contrast, when the state before the power supply is the state where the power supply to entire multifunctional machine 100 is cut off, the register has no information at all, that is, the register is in the initialized state.

S23: When main CPU 101 judges that the state before the power supply is the power save mode, that is, when main CPU 101 judges that multifunctional machine 100 has returned from the power save mode, the processing proceeds to S24. In contrast, when main CPU 101 judges that the state before the power supply is the state where the power supply to entire multifunctional machine 100 is cut off, the processing proceeds to S26.

S24: After judging that the state before the power supply is the power save mode, main CPU 101 cancels the self-refresh mode of printer RAM 105 through printer RAM control unit 104 and returns printer RAM 105 to the ordinary refresh mode.

S25: After printer RAM 105 is returned to the ordinary refresh mode, main CPU 101 performs processing necessary for the return from the power save mode to the ordinary mode, and the processing proceeds to S28. Here, processing necessary for the return from the power save mode to the ordinary mode refers to the processing that enables the reading-out of the information stored in printer RAM 105 at the time of transition to the power save mode, thereby allowing main CPU 101 to operate in accordance with the information thus read out, in the same manner as before the transition to the power save mode.

S26: In contrast, after judging at S23 that the state before the power supply is the state where the power supply to entire multifunctional machine 100 is cut off, main CPU 101 fetches a program from printer ROM 103 through printer ROM control unit 102, and sets up various settings of printer RAM control unit 104 to access printer RAM 105. Here, various settings of printer RAM control unit 104 refer to the setting of timing to access printer RAM 105, the setting of memory mapping, and the like.

S27: After making the settings of printer RAM control unit 104, main CPU 101 copies (transfers) programs stored in printer ROM 103 to printer RAM 105, then operates by fetching the programs from printer RAM 105, and performs initialization processing of the units other than printer RAM control unit 104. Here, the initialization processing refers to a setup for enabling operations of printer control unit 107.

S28: After performing the processing necessary for the return to the ordinary mode at S25 or after performing the initialization processing at S27, main CPU 101 sends scanner controller 2 a state check command through scanner communication control unit 106.

S29: After sending scanner controller 2 the state check command, main CPU 101 checks whether or not there is a response from scanner controller 2. When there is no response, the processing proceeds to S28, and main CPU 101 waits for a response from scanner controller 2. When there is a response from scanner controller 2, main CPU 101 judges that the communications with scanner controller 2 is enabled, and printer controller 1 transitions (returns) to the ordinary mode.

Figure 9:
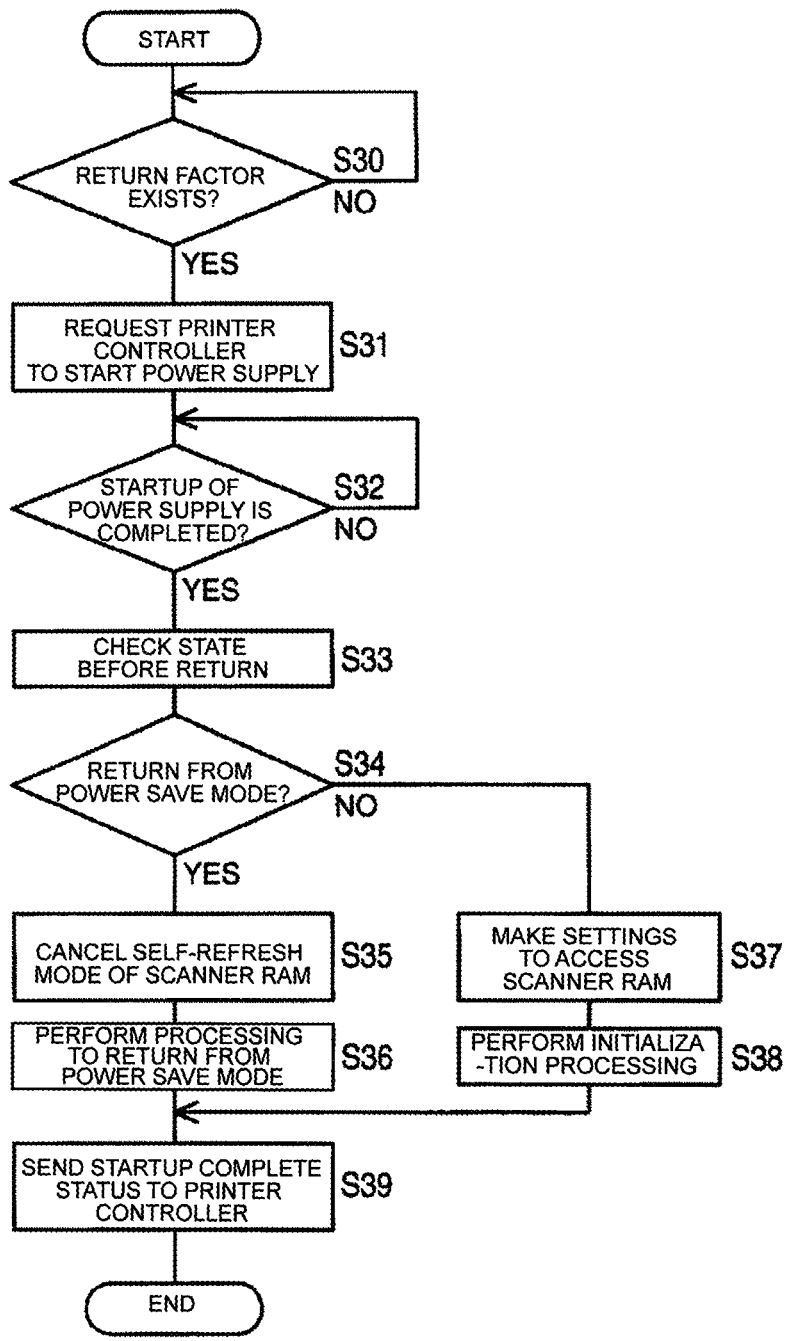
FIG. 9 is a flowchart illustrating a return-from-power save mode processing performed by the scanner controller according to the first embodiment.

Next, description is given of return-from-power save mode processing performed by the scanner controller of the multifunctional machine by referring to FIGS. 2 and 4, and following the steps denoted by S in the flowchart shown in FIG. 9 illustrating the return-from-power save mode processing performed by the scanner controller according to the first embodiment.

S30: Return factor monitor unit 210 of scanner controller 2 judges whether or not there is a factor to trigger the return from the power save mode. When return factor monitor unit 210 judges that there is a return factor, the processing proceeds to S31. When return factor monitor unit 210 judges that there is no return factor, return factor monitor unit 210 waits for the occurrence of a return factor.

S31: After judging that there is a return factor, return factor monitor unit 210 notifies power supply start request unit 211 that there is a return factor. In addition, power supply start request unit 211 sends printer controller 1 a request for the start of the power supply.

S32: After sending printer controller 1 the request for the start of the power supply, scanner controller 2 waits for printer controller 1 to start the power supply from main power unit 8.

S33: Once the power supply from main power unit 8 is started, scanner CPU 201 fetches a program from scanner ROM 203, and checks the state before the power supply (before the return).

Here, checking of the state before the power supply refers to the checking of whether the power supply from main power unit 8 and sub power unit 9 has been cut off, i.e. the power supply to entire multifunctional machine 100 has been cut off or multifunctional machine 100 has been in the power save mode. By referring to the content stored in the unillustrated register, main CPU 101 can check which of the above-mentioned two states multifunctional machine 100 has been in. When the state before the power supply is the power save mode, the register has information indicating the transition to the power save mode. In contrast, when the state before the power supply is the state where the power supply to entire multifunctional machine 100 is cut off, the register has no information at all, that is, the register is in the initialized state.

S34: When scanner CPU 201 judges that the state before the power supply is the power save mode, that is, when scanner CPU 201 judges that multifunctional machine 100 has returned from the power save mode, the processing proceeds to S35. In contrast, when scanner CPU 201 judges that the state before the power supply is the state where the power supply to entire multifunctional machine 100 is cut off, the processing proceeds to S37.

S35: After judging that the state before the power supply is the power save mode, scanner CPU 201 cancels the self-refresh mode of scanner RAM 205 through scanner RAM control unit 204 and returns scanner RAM 205 to the ordinary refresh mode.

S36: After scanner RAM 205 is returned to the ordinary refresh mode, scanner CPU 201 performs processing necessary for the return from the power save mode to the ordinary mode, and the processing proceeds to S39. Here, processing necessary for the return from the power save mode to the ordinary mode refers to the processing that enables the reading-out of the information stored in scanner RAM 205 at the time of transition to the power save mode, thereby allowing scanner CPU 201 to operate in accordance with the information thus read out, in the same manner as before the transition to the power save mode.

S37: In contrast, after judging that the state before the power supply is the state where the power supply to entire multifunctional machine 100 is cut off at S34, scanner CPU 201 fetches a program from scanner ROM 203 through scanner ROM control unit 202, and sets up various settings of scanner RAM control unit 204 to access scanner RAM 205. Here, various settings of scanner RAM control unit 204 refer to the setting of timing to access scanner RAM 205, the setting of memory mapping, and the like.

S38: After making the settings of scanner RAM control unit 204, scanner CPU 201 copies (transfers) programs stored in scanner ROM 203 to scanner RAM 205, then operates by fetching programs from scanner RAM 205, and performs initialization processing of the units other than scanner RAM control unit 204. Here, the initialization processing refers to setups for enabling operations of scanner control unit 207, FAX control unit 208, and operation control unit 209.

S39: After performing the processing necessary for the return to the ordinary mode at S36 or after performing the initialization processing at S38, scanner CPU 201 sends printer controller 1 a preparation completion status in response to the state check command, through printer communication control unit 206. Then, scanner controller 2 transitions (returns) to the ordinary mode.

As described above, in the first embodiment, after receiving, from the printer controller, instruction to transition to the power save mode, the scanner controller first completes the transition to the power save mode, and then cuts off the communications with the printer controller. Thus the following effect is obtained. Specifically, although no special signal line is provided for signals indicating the completion of the transition to the power save mode between the printer controller and the scanner controller, the printer controller detects the cutoff of the communications with the scanner controller and can judge that the scanner controller has completed the power save mode transition processing.

In addition, the following effect can also be obtained. Specifically, after detecting that the scanner controller completes the transition to the power save mode, printer controller can cut off the power supply to the scanner controller.

Second Embodiment

Figure 10:
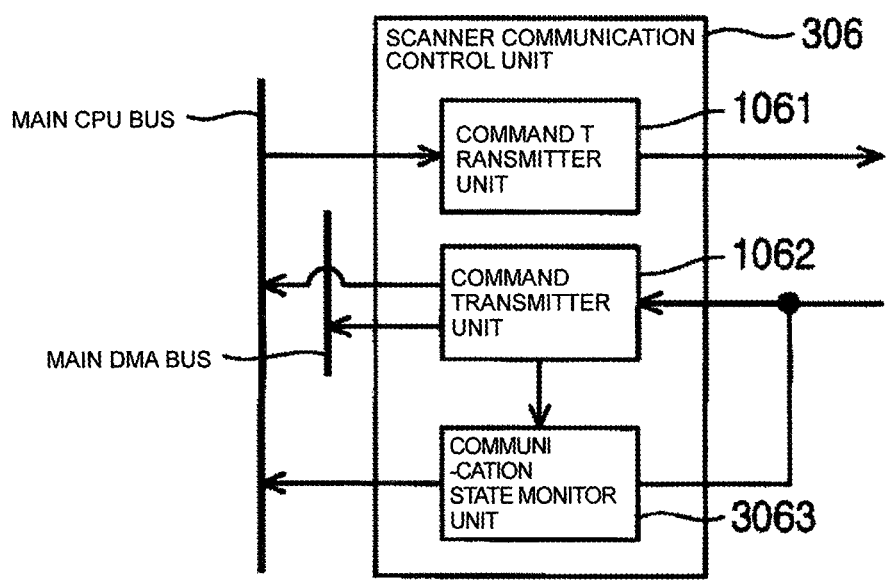
FIG. 10 is a block diagram illustrating a configuration of a scanner communication control unit according to a second embodiment.
Figure 11:
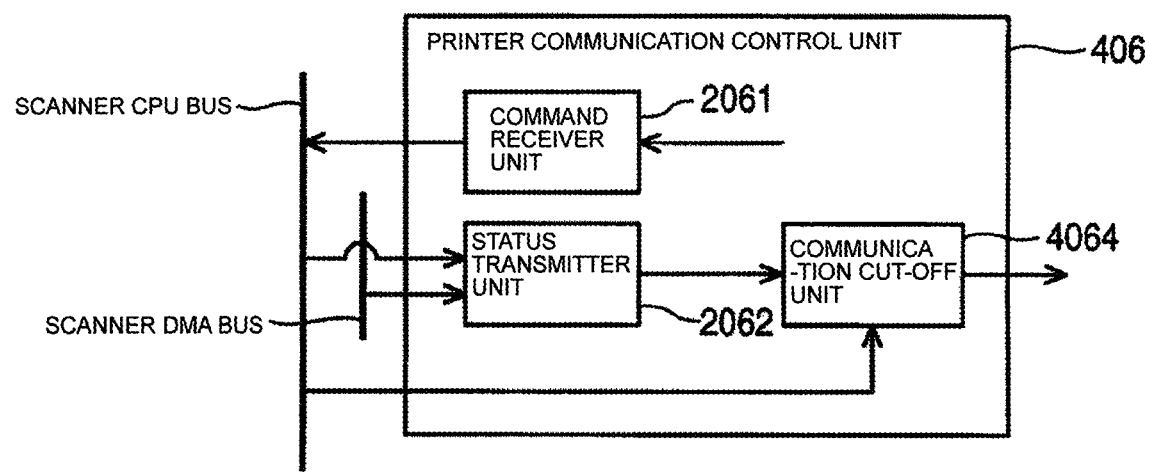
FIG. 11 is a block diagram illustrating a configuration of a printer communication control unit according to the second embodiment.

The second embodiment has a configuration different from the first embodiment in the scanner communication control unit of the printer controller and in the printer communication control unit of the scanner controller. With reference to FIGS. 1 and 4, the configuration of the second embodiment is described based on the block diagram of FIG. 10 illustrating a configuration of the scanner communication control unit according to the second embodiment as well as the block diagram of FIG. 11 illustrating a configuration of the printer communication control unit according to the second embodiment. Note that the same portions as in the first embodiment described above are denoted by the same reference numerals and the description thereof is omitted.

As shown in FIG. 10, scanner communication control unit 306 serving as a first communication control unit includes command transmitter unit 1061, status receiver unit 1062, and signal state monitor unit 3063. Signal state monitor unit 3063 is configured to monitor the state of the communication signal on the USB connecting scanner communication control unit 306 to scanner controller 2, and is also configured to judge whether the communication signal is in a communication enabled state or in a communication cut-off state. When signal state monitor unit 3063 judges that the signal state of the USB serving as the communication line to scanner controller 2 is the communication cut-off state, signal state monitor unit 3063 judges that communications with scanner controller 2 are cut off.

As shown in FIG. 11, printer communication control unit 406 includes command receiver unit 2061, status transmitter unit 2062, and communication signal control unit 4064. After command receiver unit 2061 receives a command to transition to the power save mode from printer controller 1 and scanner controller 2 completes the power save mode transition processing, communication signal control unit 4064 turns the state of the communication signal with printer controller 1 to the communication cut-off state.

Communication signal control unit 4064 outputs, as a communication signal, the status sent from status transmitter unit 2062 in the ordinary mode, but fixes the state of the communication signal to a level indicating the cutoff of the communications after the completion of the power save mode transition processing.

Figure 12:
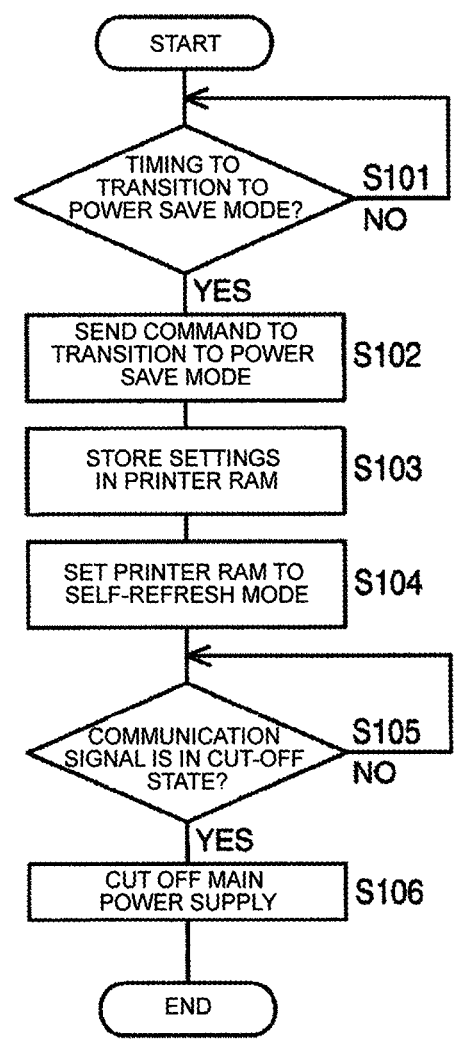
FIG. 12 is a flowchart illustrating a power save mode transition processing performed by the printer controller according to the second embodiment.

Description is given of the operations of the configuration described above. First of all, power save mode transition processing performed by the printer controller of the multifunctional machine are described by referring to FIGS. 1, 2, and 10, and following the steps denoted by S in the flowchart shown in FIG. 12 illustrating the power save mode transition processing performed by the printer controller according to the second embodiment.

S101 to S104: Since the same processing is performed as in S1 to S4 shown in FIG. 6, the detailed description thereof is omitted.

S105: After setting printer RAM 105 to the self-refresh mode, main CPU 101 judges whether or not the communication signal is in the communication cut-off state, through signal state monitor unit 3063 shown in FIG. 10. Here, the communication cut-off state of the communication signal is a state where a signal state has a level that does not occur in the communication state in the ordinary mode. For example, when the USB is used for the communications with scanner controller 2, both communication signal D+ and communication signal D− are at the LOW level in the communication cut-off state (power save mode). Since both communication signal D+ and communication signal D− are never at the LOW level simultaneously in the communication state in the ordinary mode, signal state monitor unit 3063 can judge that the communication signal is in the communication cut-off state, by detecting that both communication signal D+ and communication signal D− are at the LOW level.

When judging that the communication signal is not in the communication cut-off state, signal state monitor unit 3063 waits for the communication signal to turn into the communication cut-off state. In contrast, when judging that the communication signal is in the communication cut-off state, signal state monitor unit 3063 notifies main CPU 101 that the communications with scanner controller 2 are cut off. Then, the processing proceeds to S106.

S106: After receiving the notification of the cutoff of the communications with scanner controller 2, main CPU 101 cuts off the power supply from main power unit 8, through power supply control unit 112. Then, printer controller 1 transitions to the power save mode.

Figure 13:
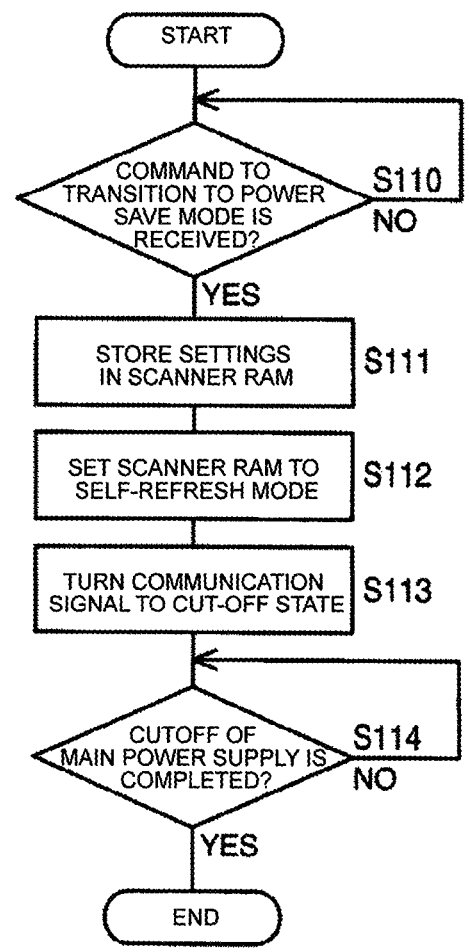
FIG. 13 is a flowchart illustrating a power save mode transition processing performed by the scanner controller according to the second embodiment.

Next, a description is given of the power save mode transition processing performed by the scanner controller of the multifunctional machine by referring to FIGS. 2, 4, and 11, and following the steps denoted by S in the flowchart shown in FIG. 13 illustrating the power save mode transition processing performed by the scanner controller according to the second embodiment.

S110 to S112: Since the same processing is performed as in S10 to S12 shown in FIG. 7, the detailed description thereof is omitted.

S113: After setting scanner RAM 205 to the self-refresh mode, scanner CPU 201 turns the communication signal to the communication cut-off state, through communication signal control unit 4064 shown in FIG. 11. Here, turning of the communication signal to the communication cut-off state refers to an operation of producing a communication signal with a level that does not occur in the communications in the ordinary mode. For example, when the USB is used for the communications with scanner controller 2, both communication signal D+ and communication signal D− are set at the LOW level in the communication cut-off state (power save mode). Since both communication signal D+ and communication signal D− are never at the LOW level simultaneously in the communication state in the ordinary mode, communication signal control unit 4064 can indicate that the communication signal is in the communication cut-off state, by setting both a communication signal D and a D− at the LOW level.

S114: After the cutting off of the communications with printer controller 1, scanner CPU 201 waits for printer controller 1 to cut off the power supply from main power unit 8. When the power supply from main power unit 8 is cut off, scanner controller 2 transitions to the power save mode.

As described above, on the basis of the state of the communication signal exchanged with scanner controller 2, printer controller 1 judges whether or not the communications with scanner controller 2 are cut off. Hence, scanner controller 2 can notify printer controller 1 that the transition to the power save mode is completed without having to output a status in response to a command from printer controller 1.

Figure 14:
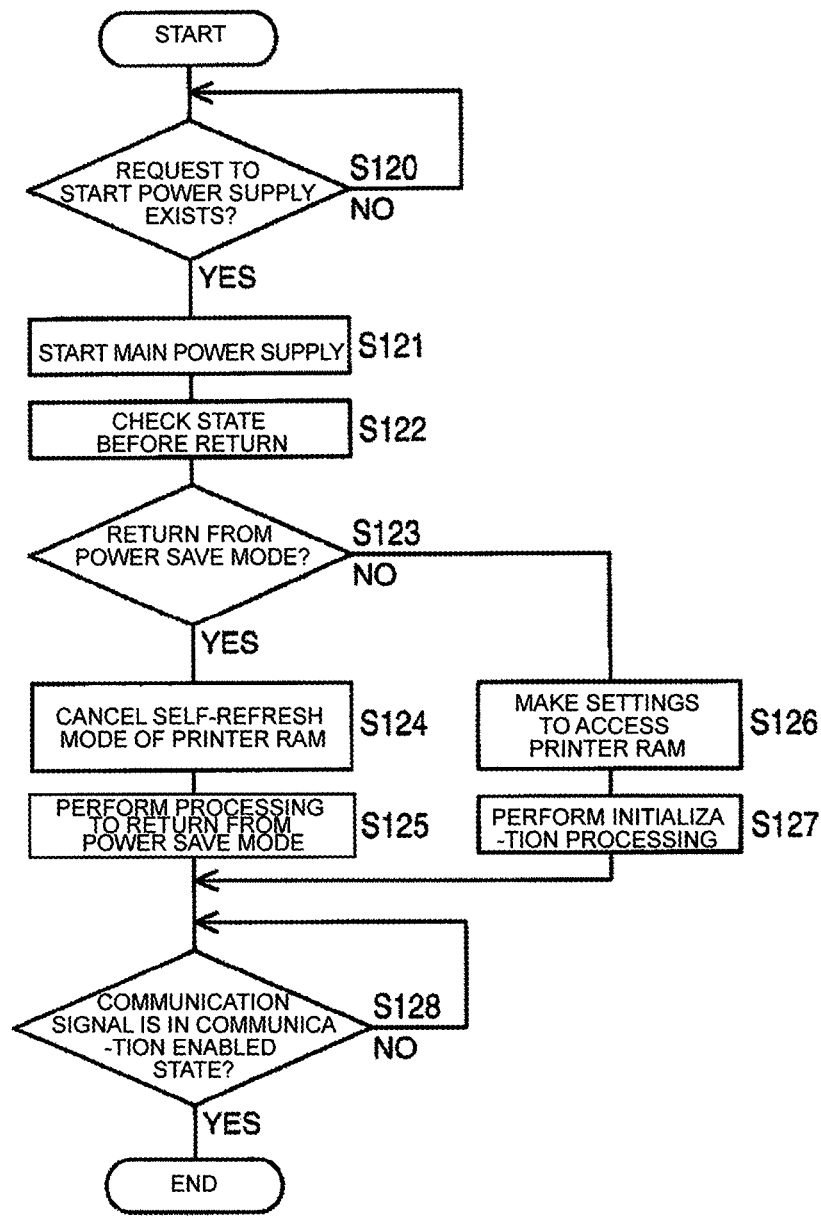
FIG. 14 is a flowchart illustrating a return-from-power save mode processing performed by the printer controller according to the second embodiment.

Next, a description is given of the return-from-power save mode processing performed by the printer controller of the multifunctional machine by referring to FIGS. 1, 2, and 10, and following the steps denoted by S in the flowchart shown in FIG. 14 illustrating the return-from-power save mode processing performed by the printer controller according to the second embodiment.

S120 to S127: Since the same processing is performed as in S20 to S27 shown in FIG. 8, the detailed description thereof is omitted.

S128: After performing the processing necessary for the return to the ordinary mode at S125 or after performing the initialization processing at S127, main CPU 101 judges whether the state of the communication signal is a communication enabled state or a communication cut-off state, through signal state monitor unit 3063 of scanner communication control unit 106. When the state of the communication signal is the communication cut-off state, main CPU 101 waits for the state of the communication signal to turn into the communication enabled state. When the state of the communication signal is the communication enabled state, main CPU 101 judges that the communications with scanner controller 2 is enabled, and then printer controller 1 transitions (returns) to the ordinary mode.

Figure 15:
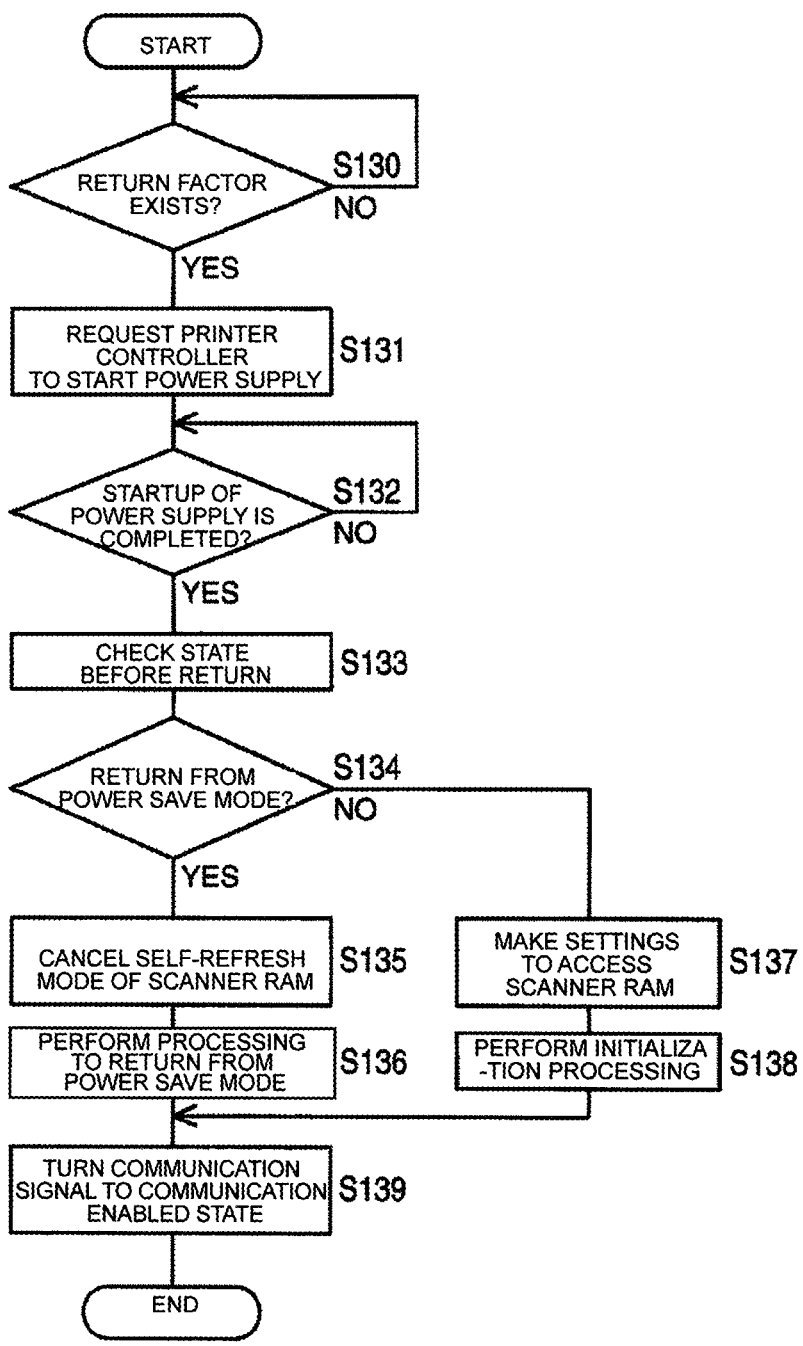
FIG. 15 is a flowchart illustrating a return-from-power save mode processing performed by the scanner controller according to the second embodiment.

Next, a description is given of the return-from-power save mode processing performed by the scanner controller of the multifunctional machine by referring to FIGS. 2, 4, and 11, and following the steps denoted by S in the flowchart shown in FIG. 15 illustrating the return-from-power save mode processing performed by the scanner controller according to the second embodiment.

S130 to S138: Since the same processing is performed as in S30 to S38 shown in FIG. 9, the detailed description thereof is omitted.

S139: After performing the processing necessary for the return to the ordinary mode at S136 or after performing the initialization processing at S138, scanner CPU 201 turns the state of the communication signal to the communication enabled state through communication signal control unit 4064 of printer communication control unit 206, and then scanner controller 2 transitions (returns) to the ordinary mode.

As described above, in addition to the effects obtainable in the first embodiment, the second embodiment has another effect. Specifically, on the basis of the state of the communication signal exchanged with the scanner controller, the printer controller judges whether or not the communications with the scanner controller are cut off. Hence, the scanner controller can notify the printer controller that the transition to the power save mode is completed without having to output a status in response to a command from the printer controller.

Note that in the descriptions of the first and second embodiments, the image formation apparatus is a multifunctional machine. However, the image formation apparatus is not limited to this, and may be a photocopier, a fax machine, or the like. In addition, in the descriptions of the first and second embodiments, the printer controller and the scanner controller are installed in the multifunctional machine. However, a printer and a scanner may be provided separately in such a way that a printer controller is installed in the printer and a scanner controller is installed in the scanner.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image formation apparatus comprising:
    an image reading control unit configured to control a scanner that reads an image of an original; and
    a print control unit configured to control a print engine that prints an image on a sheet, wherein
    the print control unit includes
        a first communication control unit connected to the image reading control unit through a communication line, and configured to communicate with the image reading control unit and to monitor a state of communications, and
        a power supply control unit configured to control a power supply to the image reading control unit,
    the image reading control unit includes
        a second communication control unit connected to the first communication control unit through the communication line, and configured to communicate with the print control unit and to cut off the communications,
    wherein the image reading control unit is configured to cut off the communications through the second communication control unit upon completion of a process to transition to a power save mode in accordance with an instruction from the print control unit,
    wherein the print control unit is configured to send the image reading control unit the instruction to transition to the power save mode through the first communication control unit, and thereafter to detect the cutoff of the communications and then cut off the power supply to the image reading control unit through the power supply control unit in response to detecting the cutoff of the communications,
    wherein the first communication control unit is configured to detect the cutoff of the communications when receiving no response to a state check command instruction sent to the second communication control unit.

2. The image formation apparatus according to claim 1, wherein
    the communication line is a universal serial bus (USB), and
    the first communication control unit judges that the communications are cut off when both a communication signal D+ of the communication line and a communication signal D− of the communication line are at a LOW level.

3. The image formation apparatus according to claim 1, wherein
    the first communication control unit is a master station of the communication line, and
    the second communication control unit is a slave station of the communication line.

4. The image formation apparatus according to claim 1, wherein
    the image reading control unit includes a volatile storage unit capable of transitioning to a self-refresh mode, and
    the process to transition to the power save mode comprises a process to cause the storage unit to store therein information set in the image reading control unit and to transition to the self-refresh mode.

5. The image formation apparatus according to claim 4, wherein
    the image reading control unit includes a power-save-mode transition information storage unit, and
    the process to transition to the power save mode comprises a process to cause the power-save-mode transition information storage unit to store information on the transition to the power save mode.

6. The image formation apparatus according to claim 1, wherein full power is maintained to the print control unit during the power save mode.

7. The image formation apparatus according to claim 1, wherein, when receiving a command to exit the power save mode, the print control unit instructs the image reading control unit to perform a start-up initialization and sends a state check command to determine whether the image reading control unit has woken up, wherein the image reading control unit is determined to have woken up from the power save mode when the print control unit receives a state check command response sent by the image reading control unit.

8. The image formation apparatus according to claim 1, wherein the power supply is cut off by the print control unit without receiving a response indicating the power save mode from the image reading control unit.

* * * * *